United States Patent
Kim et al.

(10) Patent No.: US 12,334,537 B2
(45) Date of Patent: Jun. 17, 2025

(54) POSITIVE ACTIVE MATERIAL FOR RECHARGEABLE LITHIUM ION BATTERY, PREPARING METHOD OF THE SAME, AND RECHARGEABLE LITHIUM ION BATTERY COMPRISING THE SAME

(71) Applicant: POSCO CHEMICAL CO., LTD, Pohang-si (KR)

(72) Inventors: Sun Tai Kim, Gumi-si (KR); Hye Won Park, Gumi-si (KR); Eun Hui Park, Gumi-si (KR)

(73) Assignee: POSCO CHEMICAL CO., LTD., Pohang-si (KR)

( * ) Notice: Subject to any disclaimer, the term of this patent is extended or adjusted under 35 U.S.C. 154(b) by 0 days.

(21) Appl. No.: 18/641,006

(22) Filed: Apr. 19, 2024

(65) Prior Publication Data

US 2024/0347690 A1 Oct. 17, 2024

Related U.S. Application Data

(62) Division of application No. 17/102,751, filed on Nov. 24, 2020, now abandoned.

(30) Foreign Application Priority Data

Nov. 26, 2019 (KR) .................. 10-2019-0152917

(51) Int. Cl.
  *H01M 4/131* (2010.01)
  *C01G 53/82* (2025.01)
  (Continued)

(52) U.S. Cl.
  CPC ............ *H01M 4/131* (2013.01); *C01G 53/82* (2025.01); *H01M 4/0402* (2013.01);
  (Continued)

(58) Field of Classification Search
  CPC .... H01M 4/131; H01M 4/0402; H01M 4/136; H01M 4/366; H01M 4/58
  See application file for complete search history.

(56) References Cited

U.S. PATENT DOCUMENTS

| 2011/0123865 A1* | 5/2011 | Kepler | .................. | H01M 4/366 |
| | | | | 429/223 |
| 2015/0024280 A1* | 1/2015 | Uchiyama | ........... | H01M 10/052 |
| | | | | 429/231.5 |
| 2015/0243970 A1* | 8/2015 | Choi | ..................... | H01M 4/366 |
| | | | | 429/231.95 |

FOREIGN PATENT DOCUMENTS

| CN | 106133958 A | 11/2016 |
| CN | 107204424 A | 9/2017 |

(Continued)

OTHER PUBLICATIONS

Machine Translation of CN-109873140-A (Jan. 26, 2025) (Year: 2025).*

(Continued)

*Primary Examiner* — Matthew J Merkling
(74) *Attorney, Agent, or Firm* — Sughrue Mion, PLLC

(57) ABSTRACT

The present disclosure relates to a positive electrode active material for rechargeable lithium ion batteries and a method of preparing the positive electrode active material, in which a compound including sulfur is used as an additive in a wet treatment process to remove residual lithium impurities (LiOH, $Li_2CO_3$) present on a surface of the positive electrode active material, such that the residual lithium impurities are effectively removed without loss of capacity while a Li—S compound coating layer is formed on the surface thereof, thereby reducing resistance and leakage current.

4 Claims, 4 Drawing Sheets

(51) Int. Cl.
*H01M 4/04* (2006.01)
*H01M 4/136* (2010.01)
*H01M 4/36* (2006.01)
*H01M 4/58* (2010.01)
*H01M 10/0525* (2010.01)

(52) U.S. Cl.
CPC ......... *H01M 4/136* (2013.01); *H01M 4/366* (2013.01); *H01M 4/58* (2013.01); *H01M 10/0525* (2013.01)

(56) References Cited

FOREIGN PATENT DOCUMENTS

| | | | |
|---|---|---|---|
| CN | 109873140 A | * | 6/2019 |
| EP | 2741354 A1 | | 6/2014 |
| JP | 2010-9960 A | | 1/2010 |
| JP | 2010-80168 A | | 4/2010 |
| JP | 2012-123968 A | | 6/2012 |
| JP | 2017-220339 A | | 12/2017 |
| KR | 2004073076 A | * | 8/2004 |
| KR | 10-2014-0081663 A | | 7/2014 |
| WO | 2013/021955 A1 | | 2/2013 |
| WO | 2019/212321 A1 | | 11/2019 |

OTHER PUBLICATIONS

Machine Translation of KR-2004073076-A (Jan. 26, 2025) (Year: 2025).*
Aronsson et al., "Brillouin spectra of the solid electrolyte Li2SO4," J. Chem. Phys. vol. 77, No. 2, Jul. 15, 1982, pp. 677-680 (5 pages).
Communication issued Aug. 5, 2024 in Korean application No. 10-2019-0152917.

* cited by examiner

POSITIVE ACTIVE MATERIAL FOR RECHARGEABLE LITHIUM ION BATTERY, PREPARING METHOD OF THE SAME, AND RECHARGEABLE LITHIUM ION BATTERY COMPRISING THE SAME

PRIORITY CLAIM AND CROSS-REFERENCE

This application is a Divisional of U.S. application Ser. No. 17/102,751, filed Nov. 24, 2020, which claims priority under 35 U.S.C. § 119 to Korean Patent Application No. 10-2019-0152917, filed on Nov. 26, 2019, in the Korean Intellectual Property Office (KIPO), the disclosures of which are incorporated by reference herein in their entirety.

TECHNICAL FIELD

Aspects of embodiments of the present disclosure relate to a positive electrode active material for rechargeable lithium ion batteries, a method for preparing the positive electrode active material, and a rechargeable lithium ion battery including the positive electrode active material, and more particularly, to a positive electrode active material for rechargeable lithium ion batteries capable of reducing residual lithium impurities while forming a lithium-sulfur (Li—S) compound coating layer on a surface of the positive electrode active material through a washing process using a compound containing sulfur, thereby reducing initial resistance and leakage current generation to improve battery performance, a method for preparing the positive electrode active material, and a rechargeable lithium ion battery including the positive electrode active material.

DISCUSSION OF RELATED ART

A rechargeable lithium ion battery (e.g., lithium secondary battery) which stores electricity using the principle of oxidation and reduction reactions of lithium has high voltage and energy density. Due to its high energy density, it has been used as a power source for small-sized electronic devices such as mobile phones, notebook computers, and digital cameras because it is advantageous in miniaturization and weight reduction compared to other rechargeable batteries (lead storage batteries, nickel cadmium, nickel hydrogen, etc.).

In recent times, the range of application is expanding not only to small-sized power devices, but also to power tools, high-output, high-capacity mid- to large-sized power devices for electric vehicles, and large-sized batteries for energy storage system (ESS). In particular, tightened policies related to environmental regulations in Europe and China are accelerating the expansion of electric vehicle demand. As the European Union (EU) parliament has decided to limit the carbon dioxide emissions of new vehicles sold in Europe to 95 g per kilometer by 2021, it is expected that European automakers reduce gasoline and diesel vehicles and increase electric vehicle models significantly. In line with this trend, global automakers continue to focus on electric vehicles for research and development of next-generation vehicle, and thus demand for mid- to large-sized batteries is rapidly increasing. As the demand for mid- to large-sized batteries increases, research and development on a high-nickel (high Ni (Ni≥60%))-type nickel-cobalt-manganese (NCM) ternary positive electrode active material with increased Ni composition has been continuously conducted to increase capacity of rechargeable lithium ion batteries, and currently, studies of Ni≥80% or more are actively being conducted.

In the case of such a high-Ni-type NCM ternary positive electrode active material, as the Ni content increases, it is advantageous in that the capacity increases, but due to cation mixing (mainly $Ni^{2+}/Li^+$ disorder), it has problems of performance degradation such as degradation in structural stability, increase in initial resistance, and increase in lithium impurities such as unreacted residual $Li_2CO_3$ and LiOH.

Conventional positive electrode active materials for rechargeable lithium ion batteries were prepared by mixing lithium hydroxide or lithium carbonate in a precursor, followed by heat treatment, and after this heat treatment, residual lithium hydroxide and lithium carbonate that had not participated in the reaction for preparing the positive electrode active material remained. In such a case, in the process of preparing a slurry, the residual lithium hydroxide increases a pH of the slurry to cause solidification phenomenon of the slurry, thereby making it difficult to prepare an electrode plate, and the residual lithium carbonate increases swelling phenomenon of the batteries, leading to cycle performance degradation and gas generation as well causing the battery to swell.

In particular, the lithium impurity of LiOH that remains on a surface may react with $CO_2$ in the atmosphere to additionally form $Li_2CO_3$, which not only increases initial irreversible capacity and interferes with movement of lithium ions on the surface, but also reacts with an electrolyte during electrochemical reaction to cause decomposition reaction in which $CO_2$ gas is generated, thus disadvantageously causing swelling phenomenon of the battery and high-temperature stability degradation.

Accordingly, in the case of the high-Ni-type NCM (in particular, Ni≥80%), a method of wet treatment with water or alcohol has been introduced and used to remove lithium impurities. However, in the case of the wet treatment method, Li in the active material may experience desorption in the process of removing residual lithium impurities, which may shorten battery life in the long-term perspective, or an active material surface may be oxidized after washing to form a NiO phase, which may reduce capacity or increase resistance, for example. Accordingly, there is a need for researches on a washing additive capable of removing the residual Li impurities to a desired level, while minimizing problems such as a decrease in the capacity of the active material due to washing.

SUMMARY

Embodiments of the present disclosure are directed to a positive electrode (e.g., cathode) active material prepared by using a compound containing sulfur added in a washing (e.g., water-washing) process for removing residual lithium impurities ($Li_2CO_3$ and LiOH) that are present on a surface of the active material to form a Li—S coating layer on the surface of the positive electrode active material (e.g., high-nickel positive electrode active material) containing 80 mol % or more of Ni, thereby minimizing problems such as decreased capacity of the active material due to washing and effectively removing residual lithium impurities, while improving resistance and leakage current as well, and to a method of preparing the positive electrode active material.

Embodiments of the present disclosure are also directed to a rechargeable lithium ion battery including the positive electrode active material according to an embodiment of the present disclosure.

Hereinafter, embodiments of the present disclosure will be described in detail. However, embodiments provided herein are merely given by way of example, and the present disclosure is not limited thereby, and it is to be understood that the present disclosure is only defined by the scope of the claims to be described below.

According to an embodiment of the present disclosure, a positive electrode active material for rechargeable lithium ion batteries (e.g., lithium secondary batteries) includes: a lithium metal oxide active material; and a coating layer on a surface of the active material, wherein the coating layer includes a sulfur compound.

In an embodiment, the lithium metal oxide active material as a core may be represented by the following Chemical Formula 1:

$$Li_aNi_bCo_cMn_dM_eO_2$$ [Chemical Formula 1]

(where in Chemical Formula 1, M is a metal of Al, Zr, B or a combination thereof, $0.98<a<1.2$, $0.6\leq b\leq 0.9$, $0.05\leq c\leq 0.2$, $0.01\leq d<0.2$, $0.01\leq e<0.05$, and $b+c+d+e=1$, and more specifically, $0.7\leq b\leq 0.9$, $0.05\leq c\leq 0.15$, $0.01\leq d<0.15$, $0.01\leq e<0.05$ and $b+c+d+e=1$. The above range is only an example of the present application, and the present disclosure is not limited thereto).

In an embodiment, the positive electrode active material may include a core and a coating layer, where the core is a lithium metal oxide, the coating layer includes sulfur, and a sulfur compound in the coating layer includes a lithium sulfur oxide and/or a sulfur compound.

In an embodiment, the positive electrode active material may include a coating layer including a lithium sulfur oxide and a sulfur compound.

In an embodiment, in the positive electrode active material, the lithium sulfur compound may be $Li_2S$, $Li_2SO_4$, and $Li_2SnO_x$ (where n is $1\leq n\leq 8$). In the positive electrode active material according to an embodiment, contents thereof may vary depending on type and amount of the sulfur compound to be treated, but specifically, the $Li_2SO_4$ compound may be included in an amount ranging from 70 percent by weight (wt %) to 99 wt %, the $Li_2S$ compound may be included in an amount ranging from 5 wt % to 10 wt %, and the remaining sulfur compounds $Li_2S$, $Li_2S_4$, $Li_2S_6$, $Li_2S_8$ and $Li_2SO_n$ (where n is $1\leq n\leq 8$ except $Li_2SO_4$) may be included in an amount ranging from 0 wt % to 5 wt %. No specific change in battery characteristics according to the change in weight ratio of the sulfur compounds has been reported.

In an embodiment, in the positive electrode active material, it is preferable that an added amount of the sulfur compound is specifically in a range from 0.5 wt % to 5.0 wt %. When the amount of sulfur compound is less than 0.5 wt %, residual Li reduction effects and coating effects are insufficient, and when the amount of sulfur compound is more than 5.0 wt %, a sulfur level increases higher than a certain value (more than 1000 ppm), such that a side reaction with an electrolyte solution may be caused and battery life performance may be degraded. Accordingly, it is advantageous to proceed with the coating with the addition amount within the above range.

In an embodiment, a specific reaction formula for reducing residual lithium impurities of the sulfur compound is as follows.

$nNa_2S_xO_y+nLiOH+nLi_2CO_3+nH_2O\rightarrow nLi_2SO_x+$
$nNa_2CO_3+nCO_2+nO_2+nH_2O$ ($n$=integer) [Reaction Formula]

Sulfur compound of $M_zS_xO_y$ (x ranges from 1 to 8, y ranges from 1 to 8, M is Na or K, z ranges from 0 to 3) may react with the residual lithium impurities ($Li_2CO_3$ and LiOH) through a substitution reaction and form a Li—S compound coating layer on a surface of the active material in the process of washing (e.g., water washing), thereby favorably reducing resistance and reducing leakage current generation.

In an embodiment, the positive electrode active material may have a reduced initial resistance of the battery as compared to an active material without a coating layer that includes a lithium sulfur oxide and a sulfur compound.

According to an embodiment of the present disclosure, in a positive active material for rechargeable lithium ion batteries, by adding a compound including sulfur in the process of washing, residual lithium impurities ($Li_2CO_3$ and LiOH) present on a surface of a lithium metal oxide are effectively removed while a Li—S compound coating layer is formed on the surface of the lithium metal oxide.

In an embodiment, the residual lithium ($LiOH+Li_2CO_3$) of the lithium metal oxide before wet treatment may be 6,000 ppm or more. It is not that there is no effect of reducing residual lithium impurities or no effect of forming a coating layer even if the residual lithium is less than 6,000 ppm, but if the residual lithium is less than 6,000 ppm, the effect of removing residual lithium by washing may be excessive, resulting in desorption of lithium in the active material, and thus the active material performance in terms of capacity or cycles may be degraded. Accordingly, in order to achieve effective washing effects without degrading cell performance, it is preferable that the residual lithium ($LiOH+Li_2CO_3$) of the active material is 6,000 ppm or more.

In an embodiment, the positive electrode active material includes round-shaped secondary particles in which primary particles have a diameter ranging from 0.1 to 2 μm. In an embodiment, the positive electrode active material includes secondary particles formed by agglomeration of the aforementioned primary particles, and the secondary particles have a diameter ranging from 1 to 20 μm or less.

According to another embodiment of the present disclosure, a method of preparing a positive electrode active material for rechargeable lithium ion batteries includes firing a precursor material and a lithium material to obtain a lithium metal oxide; dissolving a sulfur material in water to prepare a washing solution; immersing the lithium metal oxide positive electrode active material in the washing solution to wash the lithium metal oxide; and secondary heat-treating the washed lithium metal oxide positive electrode active material.

In an embodiment, in the method of preparing the positive electrode active material for rechargeable lithium ion batteries, by dissolving of the sulfur material in water to prepare the washing solution and by immersing of the lithium metal oxide in the washing solution to wash the lithium metal oxide, residual lithium impurities may be removed while a sulfur compound coating layer may be uniformly formed on a surface.

In an embodiment, the secondary heat-treating may be performed at a temperature ranging from 130° C. to less than 550° C. When the heat treatment temperature exceeds 130° C., a crystalline state may be maintained in a state that moisture of the sulfur compound is removed. However, when the heat treatment temperature exceeds 550° C., a structure of the sulfur compound is deformed, such that a density of the structure is lowered and a conductivity is lowered, thereby reducing the coating effect.

Accordingly, in the method for preparing the positive electrode active material for rechargeable lithium ion batteries according to an embodiment, a stable temperature range for the heat treatment of the positive electrode active material using the sulfur compound may be greater than 130° C. and less than 550° C.

DETAILED DESCRIPTION

Hereinafter, embodiments of the present disclosure will be described in detail. However, embodiments provided herein are merely given by way of example, and the present disclosure is not limited thereby, and it is to be understood that the present disclosure is only defined by the scope of the claims to be described below.

<Embodiment> Preparation of Positive Electrode Active Material

A positive electrode (e.g., cathode) active material was prepared through the following method. After mixing a dried metal oxide precursor with LiOH, the mixture was filled in a saggar and then fired in an oxygen ($O_2$) atmosphere at a firing temperature ranging from 700 to 900° C. in a firing furnace to prepare an active material.

Next, a sulfur compound was added to the fired product to perform wet washing treatment so as to remove residual lithium impurities, and thus a final positive electrode active material in which the residual lithium impurities were controlled and a coating layer including $Li_2S$ and $Li_2SO_4$ as main compounds was formed was obtained.

<Experimental Example> Measurement of Residual Lithium 5 g of the positive electrode active material prepared in the above embodiment was added to 100 ml of a deionized water (DIW), the mixture was stirred for 10 minutes and then filtered, 0.1 M of HCl was then added to 50 ml of the filtered solution, and a HCl consumption according to a pH change was measured.

Q1 and Q2 were determined according to the HCl consumed, and unreacted LiOH and $Li_2CO_3$, which are residual lithium, were calculated according to the following calculation formula, and the results are shown in the following Table 1—results of residual Li according to conventional washing and S washing.

$M1 = 23.94$(LiOH Molecular weight)

$M2 = 73.89$($Li_2CO_3$ Molecular weight)

$SPL$ Size = (Sample weight × Solution Weight)/Water Weight

-continued $LiOH(wt\%) = [(2 \times Q1 - Q2) \times 0.1 \times 23.94 \times 1000 / ((5 \times 50)/100)]$ $Li_2CO_3(wt\%) = [(Q2 - Q1) \times 0.1 \times 73.89 \times 1000 / ((5 \times 50)/100)]$

TABLE 1

| Sample | LiOH (ppm) | $Li_2CO_3$ (ppm) |
|---|---|---|
| Non-washed product | 8225 | 8404 |
| Comparative Example (conventional washing) | 3819 | 3010 |
| Embodiment (S washing) | 3841 | 2781 |

<Embodiment> Preparing of Coin Cell 96.5 wt % of the prepared positive electrode active material, 1.5 wt % of a conductive agent, and 2.0 wt % of a binder (Poly(vinylidene fluoride) (PVDF)) were mixed in the above rate and stirred using a stirrer, and then, the stirred slurry was applied to an aluminum (Al) foil and dried at 120° C. to prepare a positive electrode plate. A coin cell was prepared using the positive electrode plate, a lithium (Li) metal foil as a negative electrode plate, a polypropylene as a separator, and a general electrolyte ($LiPF_6$ salt in ethyl carbonate/ethyl-methyl carbonate/dimethyl carbonate (EC/EMC/DMC)).

Figure 1:
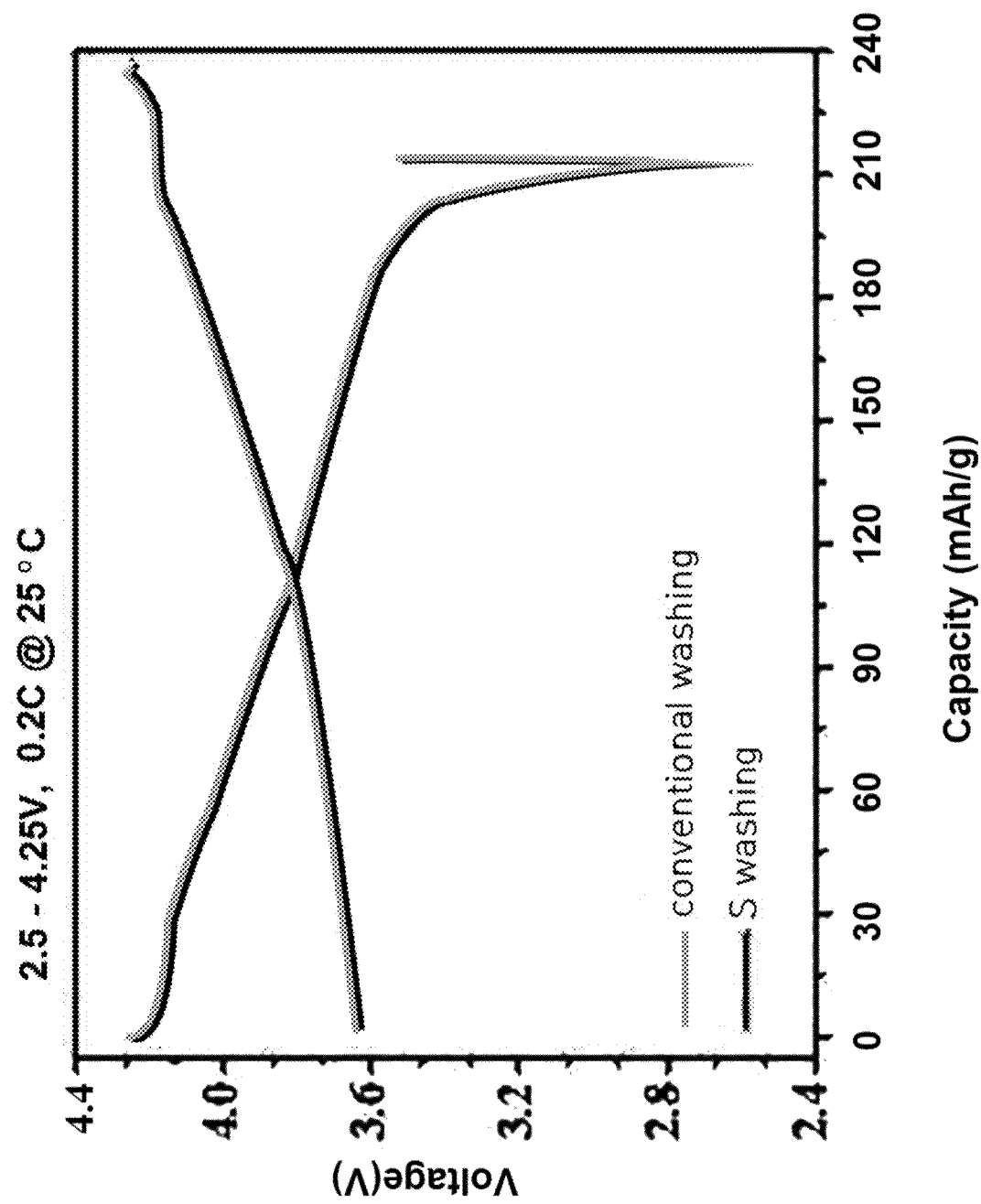
FIG. 1 illustrates capacity data of washed coin cells prepared according to an embodiment using a sulfur compound and according to a comparative example, respectively.

<Experimental Example> Measurement of Electrochemical Properties—Battery Capacity Evaluation FIG. 1 illustrates capacity results of a washed coin cell prepared using a sulfur compound and a conventional washed coin cell.

As may be seen from FIG. 1, it may be appreciated that the results of the capacities of the sulfur compound-treated product and the conventional washed product were within a margin of error.

Figure 2:
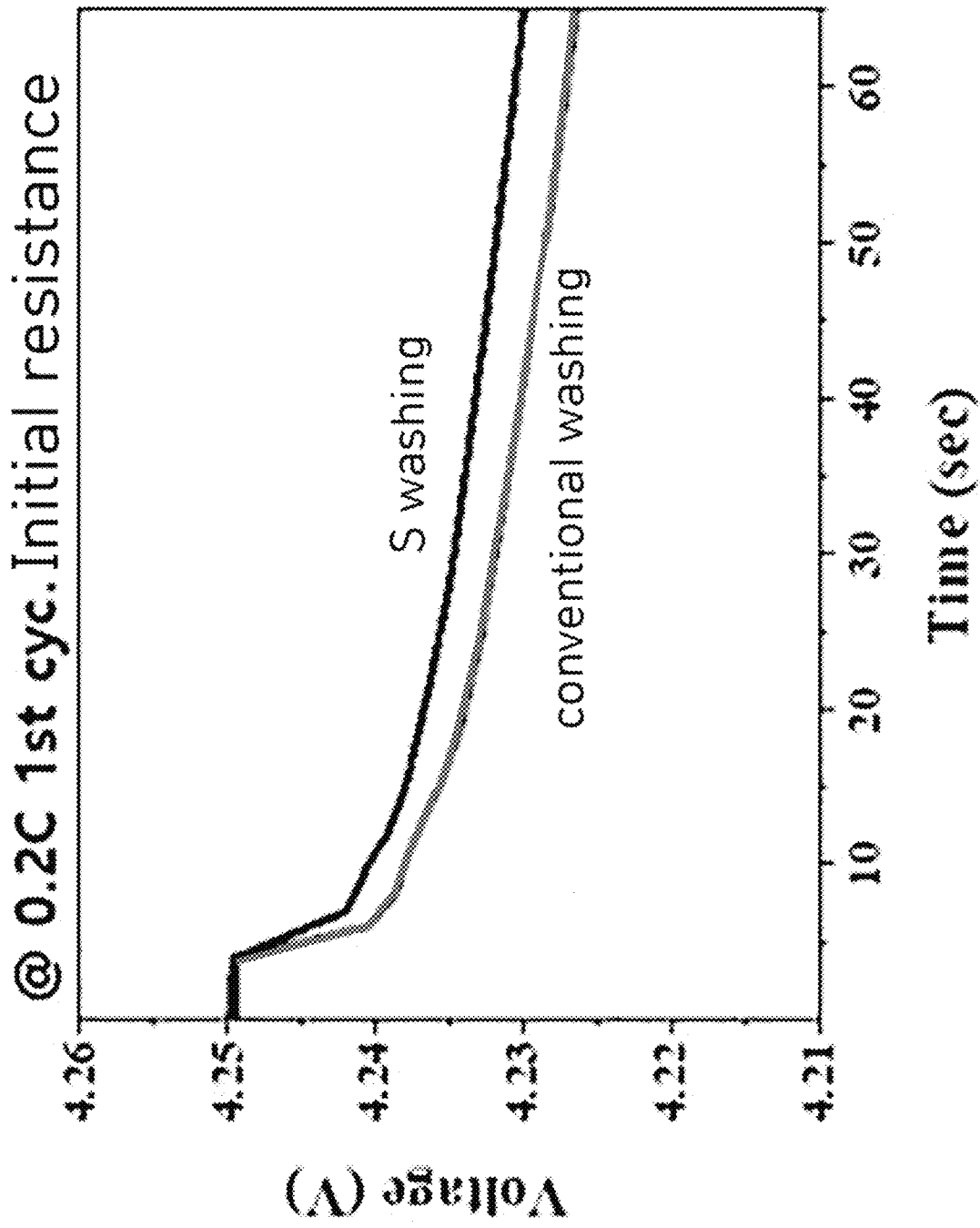
FIG. 2 illustrates resistance data of washed coin cells prepared according to an embodiment using a sulfur compound and according to a comparative example, respectively.

<Experimental Example> Measurement of Electrochemical Properties—Initial Resistance Measurement FIG. 2 illustrates initial resistance results at 0.2 C of a washed coin cell prepared using a sulfur compound and a conventional washed coin cell.

As may be seen from FIG. 2, it may be appreciated that when the coin cell was treated with the sulfur compound, the 0.2 C initial resistance result was improved from an average of 18.5Ω to 17.5Ω.

Figure 3:
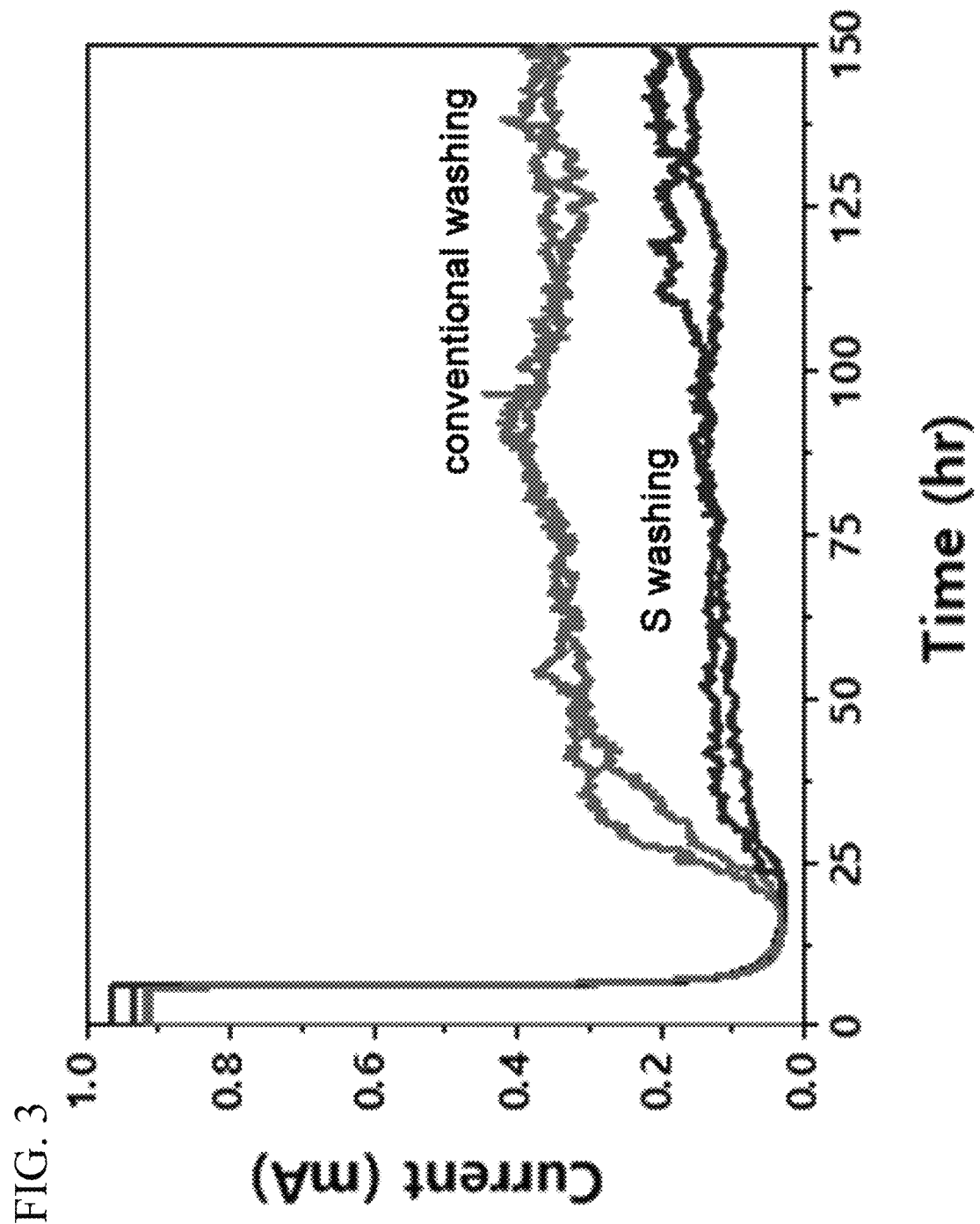
FIG. 3 illustrates overcharge leakage current measurement data of washed coin cells prepared according to an embodiment using a sulfur compound and according to a comparative example, respectively.

<Experimental Example> Measurement of Electrochemical Properties—Leakage Current Measurement FIG. 3 illustrates 4.7 V overcharge—120 hr-leakage current evaluation results of a washed coin cell prepared using a sulfur compound and a conventional washed coin cell.

As may be seen from FIG. 3, it may be appreciated that when the coin cell was treated with the sulfur compound, the leakage current result in an overcharge state for 120 hours was significantly improved from an average of 0.35 mA to 0.17 mA.

Figure 4:
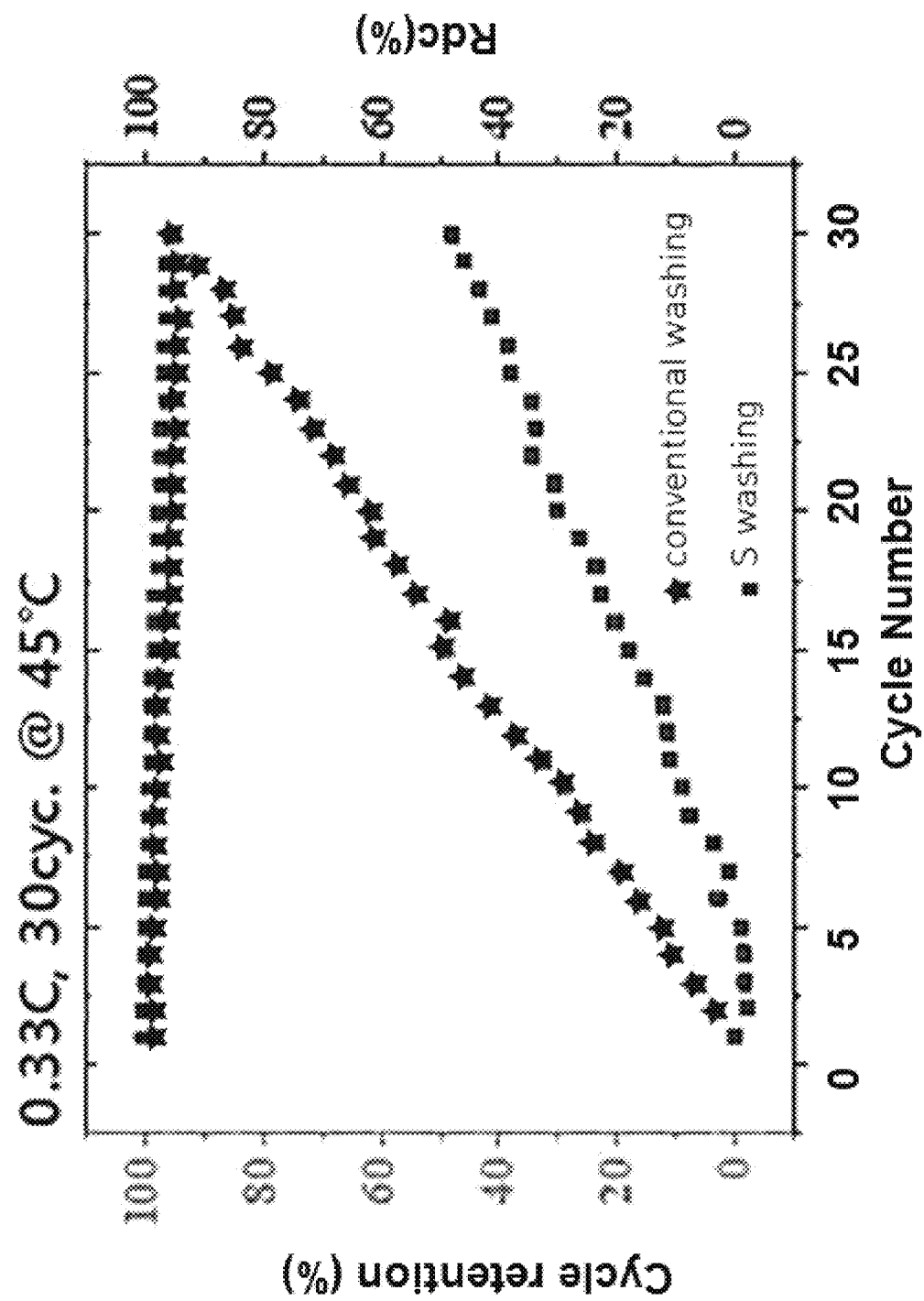
FIG. 4 illustrates life characteristics and resistance increase rate data of washed coin cells prepared according to an embodiment using a sulfur compound and according to a comparative example, respectively.

<Experimental Example> Measurement of Electrochemical Properties—Measurement of Life Characteristics and Resistance Increase Rate FIG. 4 illustrates measurement results of 30 cyc high-temperature life characteristics and resistance increase rate of a washed coin cell prepared using a sulfur compound and a conventional washed coin cell.

As may be seen from FIG. 4, it may be appreciated that when the coin cell was treated with the sulfur compound, the high-temperature life efficiency was improved from 94.6% to 95.6% and the resistance increase rate was decreased from 95.0% to 48.0%, showing that cell performance was improved.

As set forth hereinabove, in the rechargeable lithium ion battery including the positive electrode active material according to one or more embodiments of the present disclosure, the surface of the positive electrode active material is coated with a sulfur compound while residual lithium impurities are reduced in the process of washing, thereby improving problems such as initial resistance and leakage current during an overcharge test.

What is claimed is:

1. A method of preparing a positive electrode active material for rechargeable lithium ion batteries, the method comprising:

primary heat-treating a precursor material and a lithium material to obtain a lithium metal oxide;

dissolving a sulfur material in water to prepare a washing solution;

immersing the lithium metal oxide in the washing solution to wash the lithium metal oxide; and secondary heat-treating the washed lithium metal oxide, wherein the positive electrode active material comprises:

a lithium metal oxide active material;

a coating layer on a surface of the lithium metal oxide active material, wherein the coating layer comprises a sulfur compound, wherein the rechargeable lithium ion batteries contains a liquid electrolytes, wherein the sulfur compound is included in the coating layer in an amount ranging from 0.5 wt % to 5.0 wt % with respect to a total weight of the positive electrode active material, wherein the sulfur compound in the coating layer comprises one or more selected from the group consisting of $Li_2S$, $Li_2SO_4$, and $Li_2S_nO_x$, wherein n is $1 \leq n \leq 8$, and wherein the sulfur material is a compound of $M_2S_xO_y$ wherein x ranges from 1 to 8, y ranges from 1 to 8, M is Na or K, and z ranges from 0 to 3.

2. The method of claim 1, wherein the secondary heat-treating is performed at a temperature ranging from 130° C. to less than 550° C.

3. The method of claim 1, wherein a total amount of LiOH and $Li_2CO_3$ which are a residual lithium of the lithium metal oxide obtained by the primary heat-treating of the precursor material and the lithium material is substantially equal to or more than 6,000 ppm.

4. The method of claim 2, wherein the sulfur material is selected from the group consisting of $Na_2SO_3$, $Na_2SO_4$, $Na_2SO_5$, $Na_2SO_8$, $Na_2S_2O_3$, $Na_2S_2O_4$, $Na_2S_2O_5$, $Na_2S_2O_8$, $K_2SO_3$, $K_2SO_4$, $K_2SO_5$, $K_2SO_8$, $K_2S_2O_3$, $K_2S_2O_4$, $K_2S_2O_5$, and $K_2S_2O_8$.

* * * * *